United States Patent
Zhou et al.

(10) Patent No.: US 12,249,011 B2
(45) Date of Patent: Mar. 11, 2025

(54) IMAGE DRAWING METHOD AND APPARATUS, AND DEVICE AND STORAGE MEDIUM

(71) Applicant: Beijing Bytedance Network Technology Co., Ltd., Beijing (CN)

(72) Inventors: Caijin Zhou, Beijing (CN); Xinghong Hu, Beijing (CN); Xiwen Cheng, Beijing (CN); Boheng Qiu, Beijing (CN); Yuyan Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 216 days.

(21) Appl. No.: 18/020,047

(22) PCT Filed: Aug. 12, 2021

(86) PCT No.: PCT/CN2021/112183
§ 371 (c)(1),
(2) Date: Feb. 6, 2023

(87) PCT Pub. No.: WO2022/048420
PCT Pub. Date: Mar. 10, 2022

(65) Prior Publication Data
US 2023/0281892 A1    Sep. 7, 2023

(30) Foreign Application Priority Data
Sep. 2, 2020    (CN) .......................... 202010909984.0

(51) Int. Cl.
*G06T 11/20*    (2006.01)
*G06F 3/04845*    (2022.01)
(Continued)

(52) U.S. Cl.
CPC ........ *G06T 11/203* (2013.01); *G06F 3/04845* (2013.01); *G06F 3/04883* (2013.01); *G06T 11/001* (2013.01); *G06V 10/56* (2022.01)

(58) Field of Classification Search
None
See application file for complete search history.

(56) References Cited

U.S. PATENT DOCUMENTS

2016/0328865 A1    11/2016 Neulander
2016/0328866 A1*   11/2016 Neulander .............. G06T 11/20
(Continued)

FOREIGN PATENT DOCUMENTS

CN    103164158 A    6/2013
CN    105303598 A    2/2016
(Continued)

OTHER PUBLICATIONS

International Search Report issued in corresponding International Application No. PCT/CN2021/112183 dated Nov. 11, 2021.

*Primary Examiner* — Yanna Wu
(74) *Attorney, Agent, or Firm* — Astute IP Law Group

(57) ABSTRACT

An image drawing method and apparatus, and a device and a storage medium, include: in response to a release operation of dragging on a canvas, controlling a brush object located at the head of a brush queue to be dequeued; determining a display position of a brush drawing guide box on the basis of brush position information of the currently dequeued brush object, and determining a display range of the brush drawing guide box on the basis of a brush size and a brush direction; and displaying the brush drawing guide box on the canvas on the basis of the display position and the display range of the brush drawing guide box, so as to guide a user to draw a target-style image by using the brush, thereby
(Continued)

A brush object at a head of a brush queue is controlled to be dequeued, in response to an operation for releasing dragging on a canvas — S101

A display position of a brush rendering guide box is determined based on the brush position information of the currently dequeued brush object, and a display range of the brush rendering guide box is determined based on the brush size and the brush direction of the currently dequeued brush object — S102

The brush rendering guide box is displayed on the canvas based on the display position and the display range of the brush rendering guide box, where the brush rendering guide box is used to guide a user to render brushes corresponding to an image in a target style — S103 satisfying learning and entertainment requirements of the user for image drawing, and improving the user experience.

20 Claims, 5 Drawing Sheets

(51) Int. Cl.
*G06F 3/04883* (2022.01)
*G06T 11/00* (2006.01)
*G06V 10/56* (2022.01)

(56) References Cited

U.S. PATENT DOCUMENTS

2018/0101510 A1* 4/2018 Taylor ................... G06F 40/171
2020/0013197 A1   1/2020 Zou

FOREIGN PATENT DOCUMENTS

| | | | |
|---|---|---|---|
| CN | 108932141 | A | 12/2018 |
| CN | 110515531 | A | 11/2019 |
| CN | 111192348 | A | 5/2020 |
| CN | 111399729 | A | 7/2020 |
| CN | 112051959 | A | 12/2020 |
| CN | 112051960 | A | 12/2020 |
| EP | 4 083 774 | A1 | 11/2022 |
| JP | 2013164489 | A | 8/2013 |

* cited by examiner

IMAGE DRAWING METHOD AND APPARATUS, AND DEVICE AND STORAGE MEDIUM

The present application is a national stage of International Application No. PCT/CN2021/112183, filed on Aug. 12, 2021, which claims priority to Chinese Patent Application No. 202010909984.0, titled "IMAGE DRAWING METHOD AND APPARATUS, AND DEVICE AND STORAGE MEDIUM", filed on Sep. 2, 2020 with the China National Intellectual Property Administration, both of which are incorporated herein by reference in their entireties.

FIELD

The present disclosure relates to the field of data processing, and in particular to a method and apparatus for rendering an image, a device, and a storage medium.

BACKGROUND

Image rendering is a talent that has attracted much attention at present, and people's requirements for learning and entertainment of image rendering are increasing. However, software for image rendering is scarce at present, which apparently cannot meet people's demand.

Therefore, how to realize functions of image rendering software to meet the needs of users for learning and entertainment of image rendering is a technical problem that needs to be solved urgently at present.

SUMMARY

In order to solve or at least partially solve the above technical problems, a method and apparatus for rendering an image, a device and a storage medium are provided according to embodiments of the present disclosure, which can meet the requirements of users for learning and entertainment of image rendering in a specific style, and improve the user experience.

A method for rendering an image is provided according to an embodiment of the present disclosure. The method includes:
controlling a brush object at a head of a brush queue to be dequeued, in response to an operation for releasing dragging on a canvas, where attributes of the brush object in the brush queue includes a brush size, a brush direction and brush position information;
determining a display position of a brush rendering guide box based on the brush position information of the currently dequeued brush object, and determining a display range of the brush rendering guide box based on the brush size and the brush direction of the currently dequeued brush object; and
displaying the brush rendering guide box on the canvas based on the display position and the display range of the brush rendering guide box, where the brush rendering guide box is used to guide a user to render brushes corresponding to an image in a target style.

In an optional embodiment, the method further includes:
controlling brush objects in the brush queue to be sequentially dequeued, in response to a triggering operation for switching a current mode to a target rendering mode; and
rendering, on the canvas, brushes corresponding to the brush objects sequentially based on the attributes of the brush objects that are sequentially dequeued.

In an optional embodiment, the method further includes:
rendering, in response to detecting a dragging operation on the canvas, brushes corresponding to the dragging operation on the canvas, where the brush sizes and colors of the brushes change in real time with the dragging operation.

In an optional embodiment, the method further includes:
determining a dequeuing speed of the brush objects in the target rendering mode, in response to an adjusting operation on an image rendering speed; and
correspondingly, the controlling brush objects in the brush queue to be sequentially dequeued includes:
controlling the brush objects in the brush queue to be sequentially dequeued based on the dequeuing speed of the brush objects.

In an optional embodiment, the method further includes:
clearing the canvas in response to a triggering operation on a re-rendering control.

In an optional embodiment, the method further includes:
determining a target image effect picture in response to an adjusting operation on an image color; and
determining, based on the target image effect picture, colors of brushes rendered on the canvas after the adjusting operation on the image color.

In an optional embodiment, the method further includes:
obtaining a brush queue corresponding to a target rendering difficulty, in response to a selection operation of the target rendering difficulty, where brush queues corresponding to different rendering difficulties have different numbers of brush objects.

In a second aspect, an apparatus for rendering an image is provided according to the present disclosure. The apparatus includes a first control module, a first determination module, and a display module.

The first control module is configured to control a brush object at a head of a brush queue to be dequeued, in response to an operation for releasing dragging on a canvas, where attributes of the brush object in the brush queue include a brush size, a brush direction and brush position information.

The first determination module is configured to determine a display position of a brush rendering guide box based on the brush position information of the currently dequeued brush object, and determining a display range of the brush rendering guide box based on the brush size and the brush direction of the currently dequeued brush object.

The display module is configured to display the brush rendering guide box on the canvas based on the display position and the display range of the brush rendering guide box, where the brush rendering guide box is used to guide a user to render brushes corresponding to an image in a target style.

In a third aspect, a computer-readable storage medium is provided according to the present disclosure. Instructions are stored in the computer-readable storage medium. The instructions, when executed on a terminal device, cause the terminal device to implement the foregoing method.

In a fourth aspect, a device is provided according to the present disclosure. The device includes: a memory, a processor, and computer programs stored in the memory and executable on the processor, where the processor, when executing the computer programs, implements the foregoing method.

Compared with the conventional technology, the technical solutions according to the embodiments of the present disclosure have the following advantages.

A method for rendering an image is provided according to an embodiment of the present disclosure. In response to an operation for releasing dragging on a canvas, a brush object at a head of a brush queue is controlled to be dequeued. Then, a display position of a brush rendering guide box is determined based on brush position information of the currently dequeued brush object, and a display range of the brush rendering guide box is determined based on a brush size and a brush direction of the currently dequeued brush object. Finally, the brush rendering guide box is displayed on the canvas based on the display position and the display range of the brush rendering guide box, in order to guide a user to render brushes corresponding to an image in a target style. In the embodiments of the present disclosure, the brush rendering guide box is displayed for a user on the canvas based on the attributes of the brush objects in the brush queue, so that the user can render the brushes based on the brush rendering guide box, in order to satisfy the requirements of the user for learning and entertainment of image rendering in a specific style and improve the user experience.

BRIEF DESCRIPTION OF THE DRAWINGS

The accompanying drawings, which are incorporated in and constitute a part of the specification, illustrate embodiments consistent with the present disclosure and serve to explain the principles of the present disclosure together with the description.

In order to more clearly illustrate the technical solutions in the embodiments of the present disclosure or in the conventional technology, the accompanying drawings used in the description of the embodiments or the conventional technology will be briefly introduced hereinafter. Apparently, other drawings can be obtained for those skilled in the art based on these drawings without any creative efforts.

DETAILED DESCRIPTION

In order to more clearly understand the above objects, features and advantages of the present disclosure, the solutions of the present disclosure will be further described hereinafter. It should be noted that the embodiments of the present disclosure and the features in the embodiments may be combined with each other without conflicts.

Specific details are set forth in the following description to facilitate substantially understanding the present disclosure, but the present disclosure may also be implemented in other ways different from those described herein. Apparently, the embodiments in the description are only a part of the embodiments of the present disclosure, rather than all embodiments.

With the increase of people's interest in rendering images in a specific style, such as oil paintings, software developers are paying more and more attention to the research and development of image rendering software. How to realize the functions of image rendering software and satisfy users' requirements for learning and entertainment of image rendering to the greatest extent is a technical problem required to be solved urgently at present.

In view of this, a method for rendering an image is provided according to the present disclosure. In response to an operation for releasing dragging on a canvas, a brush object at a head of a brush queue is controlled to be dequeued. Then a display position of a brush rendering guide box is determined based on brush position information of the currently dequeued brush object, and a display range of the brush rendering guide box is determined based on a brush size and a brush direction of the currently dequeued brush object. Finally, the brush rendering guide box is displayed on the canvas based on the display position and the display range of the brush rendering guide box, in order to guide a user to render brushes corresponding to an image in a target style.

In the present disclosure, the brush rendering guide box is displayed for the user on the canvas based on the attributes of the brush objects in the brush queue, so that the user can render the brush based on the brush rendering guide box, in order to satisfy the user's requirements for learning and entertainment of image rendering and improve the user experience.

In addition, in the method, the brush objects in the brush queue are controlled to be sequentially dequeued, in the case that a current mode is switched to a target rendering mode. The brushes corresponding to the brush objects are sequentially rendered on the canvas based on the attributes of the brush objects that are sequentially dequeued. It can be seen that with the present disclosure, the rendering of the brush can be automatically controlled to provide a teaching video of image rendering for the user, to further satisfy the user's requirements for learning of image rendering, thereby improving the user experience.

Figure 1:
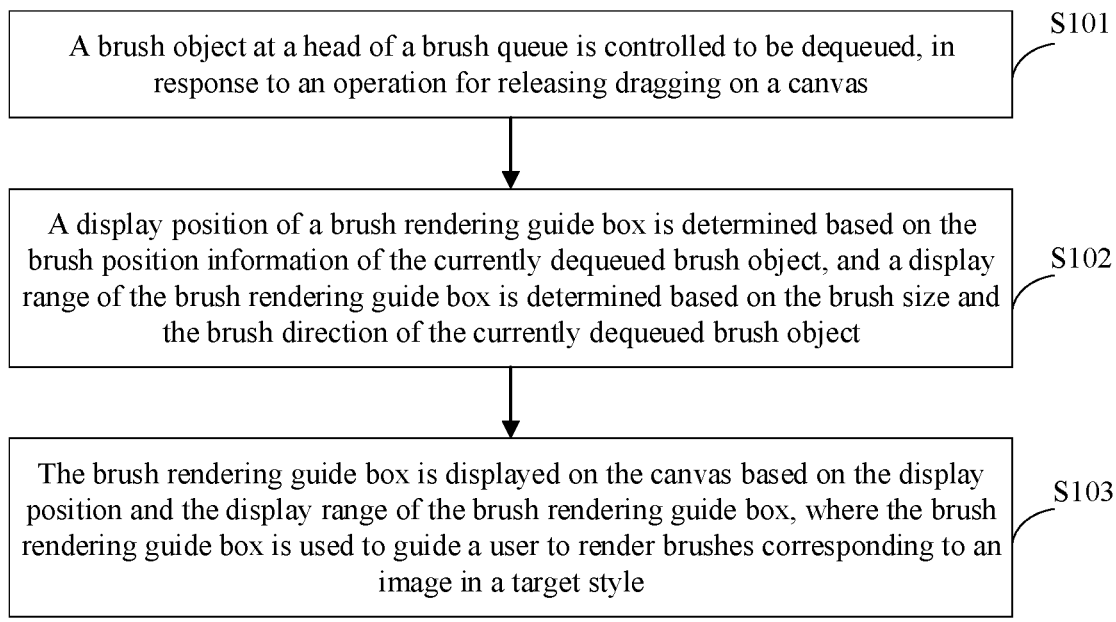
FIG. 1 is a flowchart of a method for rendering an image according to an embodiment of the present disclosure.

In view of this, a method for rendering an image is provided according to an embodiment of the present disclosure. FIG. 1 is a flowchart of a method for rendering an image according to an embodiment of the present disclosure. Referring to FIG. 1, the method includes S101 to S103.

In S101, a brush object at a head of a brush queue is controlled to be dequeued, in response to an operation for releasing dragging on a canvas.

In an embodiment of the present disclosure, before an interactive function of learning or entertainment of image rendering in a predetermined style for an image is implemented, a brush queue of the image in the predetermined style corresponding to the image is firstly determined.

Figure 2:
FIG. 2 is a schematic diagram of a rendering difficulty selection interface according to an embodiment of the present disclosure.

In an optional embodiment, a rendering difficulty of the image in the predetermined style may be set in advance. For example, the rendering difficulty includes three rendering difficulties of a beginner mode, a middle-class mode and an expert mode, the degrees of which are gradually increased. FIG. 2 is a schematic diagram of a rendering difficulty selection interface according to an embodiment of the present disclosure. As shown in FIG. 2, a rendering difficulty may be selected by the user as a target rendering difficulty, and a brush queue corresponding to the target rendering difficulty is obtained, so as to realize the rendering interaction of the image in the predetermined style by using the brush objects in the brush queue. Specifically, brush queues with different rendering difficulties have different numbers of brush objects. Generally, the brush queue with a high rendering difficulty has the great number of brush objects. In addition, the brush queues with different rendering difficulties have different attributes, such as a brush size, of the brush objects.

In practical applications, a brush queue corresponding to a target rendering difficulty is obtained in response to a selection operation of the target rendering difficulty, where brush queues corresponding to different rendering difficulties have different numbers of brush objects.

In an embodiment of the present disclosure, each of brush objects in the brush queue has attributes of a brush size, a brush direction and brush position information. The attributes of the brush object are stored in the brush queue. The brush size corresponds to the brush object. The brush direction is used to indicate a rendering direction of a brush corresponding to the brush object, for example a direction from left to right. The brush position information is used to indicate a position of a center point of the brush corresponding to the brush object.

In addition, the attribute of the brush object further includes a brush color, where the brush color indicates a color of the center point of the brush corresponding to the brush object.

In an optional embodiment, the method for rendering the image according to an embodiment of the present disclosure includes at least a first image rendering mode. The user may determine the current mode as the first image rendering mode through operations such as mode switching or mode selection.

In the first image rendering mode, the user may render the brushes by some operations, such as dragging a mouse or dragging a finger on the canvas. When the operation for releasing dragging on the canvas is detected, the brush object at the head of the brush queue is controlled to be dequeued, and the brush object is determined as the currently dequeued brush object. Then, the brush rendering guide box is displayed based on attributes of the current dequeued brush object. The specific display method of the brush rendering guide box is described hereinafter. The canvas refers to a blank area for rendering the brush on a brush rendering interface.

In practical applications, the first image rendering mode may be referred to a manual rendering mode. That is, a user may render an image in a target style by manually rendering the brush, based on the brush rendering guide box.

In S102, a display position of a brush rendering guide box is determined based on the brush position information of the currently dequeued brush object, and a display range of the brush rendering guide box is determined based on the brush size and the brush direction of the currently dequeued brush object.

Since the brush rendering guide box is used to guide the user to render a next brush on the canvas, the determination of the brush rendering guide box based on the attributes of the currently dequeued brush object can accurately guide the position and the range of the next brush to be rendered by the user.

In view of this, in the embodiments of the present disclosure, the attributes, specifically including the brush size, the brush direction, and the brush position information, of the currently dequeued brush object are determined, so as to accurately display the brush rendering guide box for the user based on the determined attributes.

In an embodiment of the present disclosure, the display position of the brush rendering guide box is determined based on the brush position information of the currently dequeued brush object. Specifically, the brush position information of the currently dequeued brush object is used as a position of the center point of the brush rendering guide box.

In addition, the display range of the brush rendering guide box is determined based on the brush size and the brush direction of the currently dequeued brush object. Specifically, an area occupied by the brush rendering guide box is determined based on the brush size, and the direction of the brush rendering guide box is determined based on the brush direction. Then, the display range of the brush rendering guide box is determined in combination with the determined area and direction of the brush rendering guide box.

In S103, the brush rendering guide box is displayed on the canvas based on the display position and the display range of the brush rendering guide box, where the brush rendering guide box is used to guide a user to render brushes corresponding to an image in a target style.

In an embodiment of the present disclosure, after the display position and the display range of the brush rendering guide box is determined, a display region of the brush rendering guide box on the canvas is determined in combination with the display position and the display range. Then, the brush rendering guide box is displayed on the display region, so that the user can render the next brush for the image in the target style based on the brush rendering guide box. The image in the target style may refer to a type of images with an artistic style, such as an image in an oil painting style and an image in a sketch style.

Figure 3:
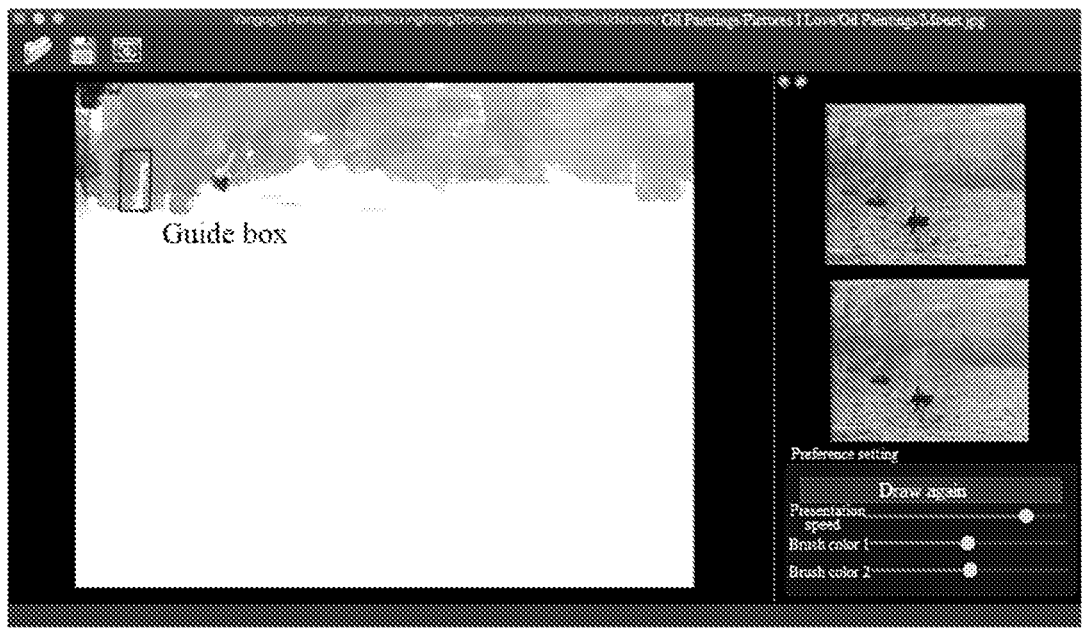
FIG. 3 is a schematic diagram of an interface of a manual rendering mode according to an embodiment of the present disclosure.

FIG. 3 is a schematic diagram of an interface of a manual rendering mode according to an embodiment of the present disclosure. As shown in FIG. 3, a canvas is shown at the left part of FIG. 3, and a brush rendering guide box is displayed on the canvas. A black thick line rectangle indicates the displayed brush rendering guide box. Specifically, the brush rendering guide box may has a shape of a rectangle, a circle, an ellipse, an irregular shape, or the like; and may also be implemented based on a predetermined animation, a virtual image, or the like. The specific form of the brush rendering guide box is not limited in the embodiment of the present disclosure.

In practical applications, the user may render brushes in the brush rendering guide box based on the brush rendering guide box displayed on the canvas, such that the brushes may be render at an optimal position and in an optimal range. In this way, image rendering can be learned.

In addition, the user may render brushes at any position by dragging a mouse or a finger on the canvas, to realize an entertainment function of image rendering.

Specifically, when the operation of dragging on the canvas is detected, the user is rendering brushes on the canvas. Therefore, the brushes may be rendered in response to the operation of dragging. For example, the user may render the brushes corresponding to the operation of the dragging on the canvas. The sizes and the colors of the rendered brushes may change in real time with a current on the canvas.

In practical applications, when the user renders the brushes through the operation of dragging on the canvas, the rendered brushes are gradually elongated and the positions of the center points of the brushes change in real time, with the operation of dragging on the canvas. Since the color of the brush is determined based on the color of the center point of the brush, the colors of the brushes change in real time. When the operation for releasing dragging is detected, the rendering of the brush is ended on the canvas, and the center point of the brush at present is determined as a center point of a final rendered brush, and the color of the brush is determined based on a color of the center point at a corresponding position in an original image.

In an optional embodiment, the user may clear the content on the canvas by triggering a re-rendering control, such as the "Draw again" button in FIG. 3. Specifically, when a triggering operation on the re-rendering control is detected, the canvas is cleared so that the user can re-render the image on a blank canvas.

In another optional embodiment, the user may further adjust the color of the rendered image to change an overall tone of the rendered image. In the image rendering, subsequent brushes may be rendered based on a target image effect picture obtained by the latest color adjustment.

Specifically, when an adjustment operation on the image color is detected, the target image effect picture is determined, and then the colors of the brushes rendered on the canvas after the adjustment operation on the image color are determined based on the target image effect picture. In this way, the same image may be rendered with different tones in different regions.

In practical applications, the target image effect picture may be previewed and displayed. As shown in FIG. 3, a window in the upper right corner is used to preview and display the target image effect picture, and a window in the lower right corner is used to display the original image. Sliders corresponding to the displayed brush color 1 and brush color 2 respectively shown in FIG. 3 are adjusted by the user to control the saturation of channel a and the saturation of channel b in a Lab color space, to realize the overall adjustment of the image color of the original image. Then, the adjusted image may be previewed and displayed in the window in the upper right corner as the target image effect picture.

In practical applications, after the overall adjustment of the image color is performed to obtain the target image effect picture, a time point at which the overall adjustment of the image color is performed may be used as a starting time point. After the starting time point, colors of brushes on the canvas are determined based on the target image effect picture. Specifically, the colors of the brushes rendered on the canvas after the starting time point are determined based on the color values of pixel points at positions corresponding to the brushes on the target image effect picture.

In the method for rendering an image according to the embodiment of the present disclosure, in response to an operation for releasing dragging on a canvas, a brush object at a head of a brush queue is controlled to be dequeued. Then, a display position of a brush rendering guide box is determined based on brush position information of the currently dequeued brush object, and a display range of the brush rendering guide box is determined based on a brush size and a brush direction of the currently dequeued brush object. Finally, the brush rendering guide box is displayed on the canvas based on the display position and the display range of the brush rendering guide box, in order to guide a user to render brushes corresponding to an image in a target style. In the embodiments of the present disclosure, the brush rendering guide box is displayed for a user on the canvas based on the attributes of the brush objects in the brush queue, so that the user can render the brushes based on the brush rendering guide box, in order to satisfy the requirements of the user for learning and entertainment of image rendering and improve the user experience.

Figure 4:
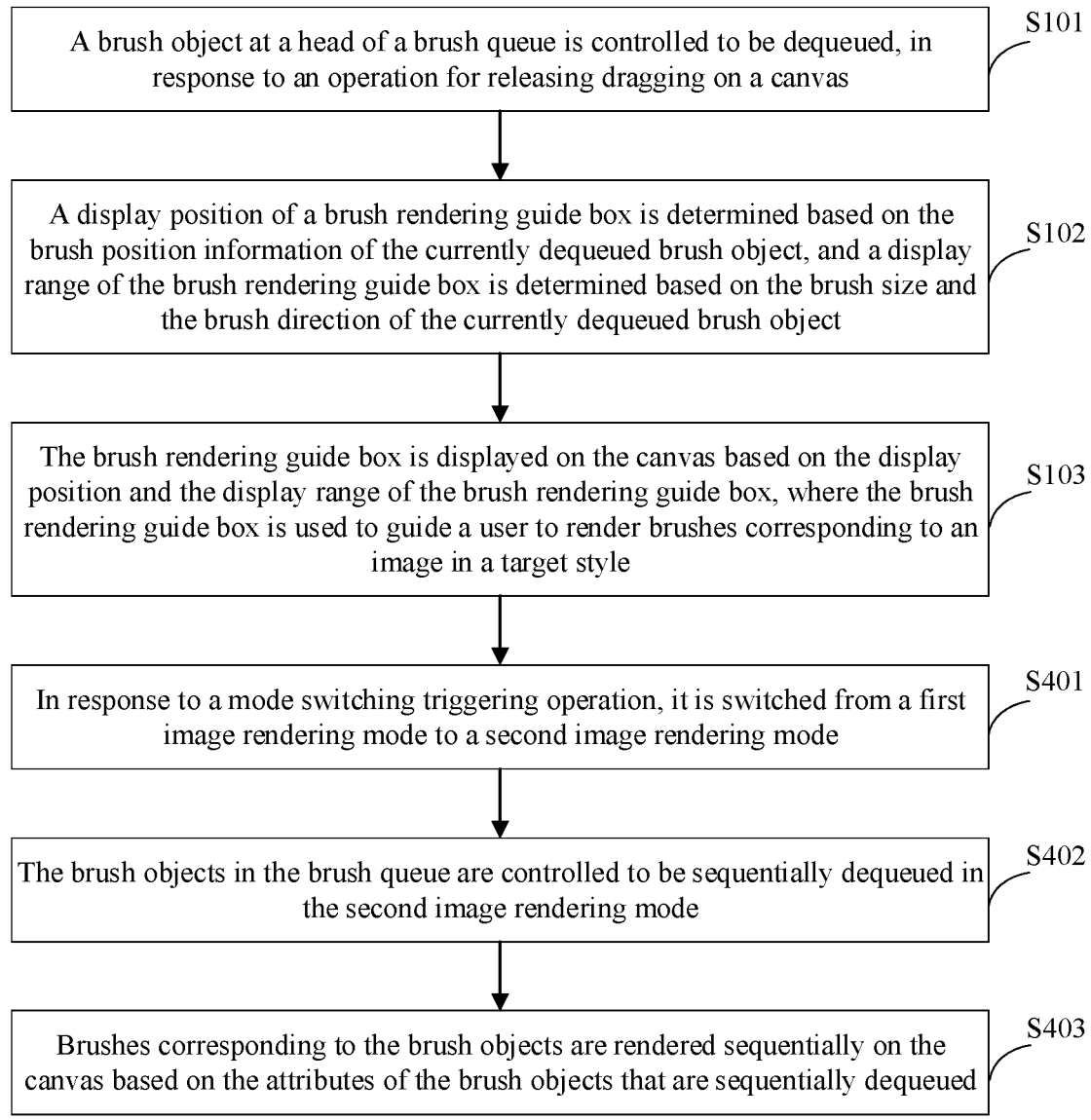
FIG. 4 is a flowchart of a method for rendering an image according to another embodiment of the present disclosure.

In order to enrich the interactive function of image rendering, a method for rendering an image is further provided according to an embodiment of the present disclosure. FIG. 4 is a flowchart of a method for rendering an image according to another embodiment of the present disclosure. Referring to FIG. 4, on the basis of the steps in FIG. 1, the method further includes S401 to S403.

In S401, in response to a mode switching triggering operation, it is switched from a first image rendering mode to a second image rendering mode.

In an embodiment of the present disclosure, the mode switching triggering operation indicates an operation triggered by a user for switching a current mode to the target rendering mode. In an embodiment of the present disclosure, the current mode is switched from the first image rendering mode to the second image rendering mode in response to a reception of the mode switching triggering operation.

In an optional embodiment, the user may switch the mode from the first image rendering mode to the second image rendering mode by clicking on a mode switching control or other operations.

In practical applications, switching the current mode to the target rendering mode through the mode switching triggering operation may indicates switching from the second image rendering mode to the first image rendering mode. Specifically, in the first image rendering mode, a brush object at the head of a brush queue is controlled to be dequeued, so as to render the brush. The mode switching triggering operation may be triggered based on user requirements, and timing for triggering the mode switching is not limited.

In S402, the brush objects in the brush queue are controlled to be sequentially dequeued in the second image rendering mode.

Figure 5:
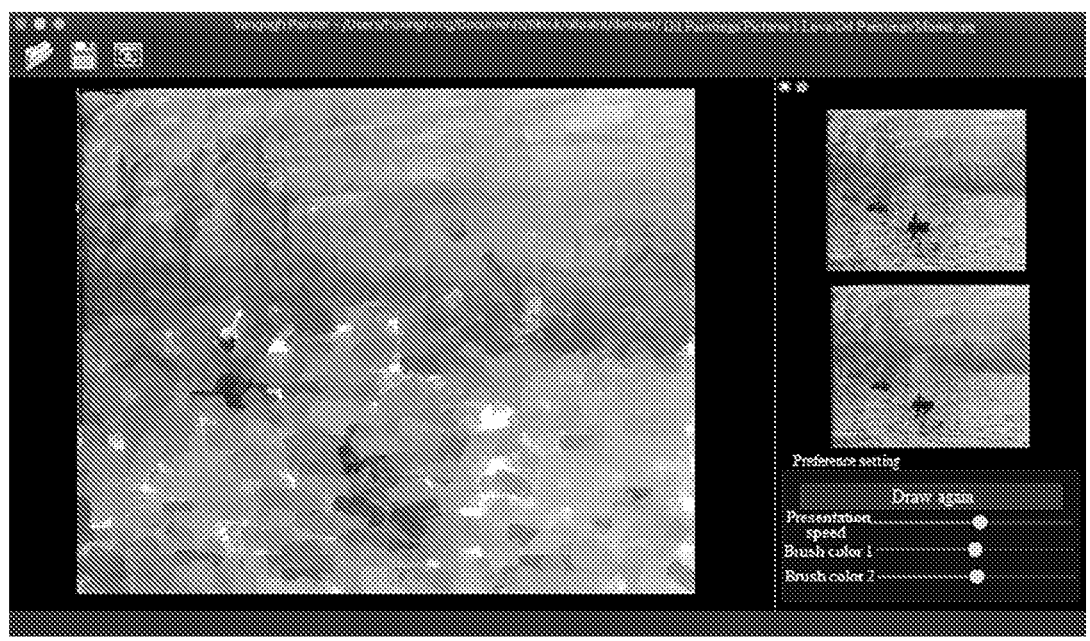
FIG. 5 is a schematic diagram of an interface of an automatic rendering mode according to an embodiment of the present disclosure.

In an embodiment of the present disclosure, when it is detected that the current mode is in the second image rendering mode, the brush objects in the brush queue are controlled to be sequentially dequeued based on a queue principle of first-in-first-out. In practical applications, the second image rendering mode may be referred to an automatic rendering mode. FIG. 5 is a schematic diagram of an interface of an automatic rendering mode according to an embodiment of the present disclosure, where the brushes on the canvas are automatically rendered.

In an optional embodiment, several brushes are rendered on the canvas in the first image rendering mode. In this case, if the current mode is switched to the second image rendering mode, the brush objects in the brush queue are continued to be controlled to be dequeued based on the brushes already rendered on the canvas, to complete the rendering of subsequent brushes on the canvas in the second image rendering mode. That is, the user may randomly switch the current mode during the image rendering, and finally the image may be rendered in different rendering modes.

In another optional embodiment, when the mode switching triggering operation is detected, the canvas may be cleared, so that the image may be re-rendered on a blank canvas based on the switched brush rendering mode.

In S403, brushes corresponding to the brush objects are rendered sequentially on the canvas based on the attributes of the brush objects that are sequentially dequeued.

In an embodiment of the present disclosure, after the brush objects in the brush queue are controlled to be dequeued, the brushes corresponding to the brush objects are sequentially rendered on the canvas based on the attributes of the dequeued brush objects, so as to realize the automatic rendering of the brushes on the canvas.

In practical applications, during the automatic rendering of the brush on the canvas, the user may manually render the brushes at any position of the canvas by dragging a mouse or a finger or other operations, to improve the use experience of the user. Specifically, when a dragging operation on the canvas is detected, a brush corresponding to the dragging operation is rendered on the canvas.

In practical applications, in the automatic brush rendering, when the user renders the brushes through an operation of dragging on the canvas, the rendered brushes are gradually elongated and positions of center points of the brushes changes in real time, with the operation of dragging. Since the color of the brush is determined based on the color of the center point of the brush, the colors of the brushes change in real time. When the operation for releasing dragging is detected, the rendering of the brush ends on the canvas, the center point of the brush at this time is determined as a center point of a final rendered brush, and the brush color is determined based on the color of the center point at a corresponding position in an original image.

In an optional embodiment, in the second image rendering mode, the user may adjust an automatic rendering speed of the brushes on the canvas. Specifically, the dequeuing speed of the brush objects is determined when an adjustment operation on the image rendering speed is detected. Then, the brush objects in the brush queue are controlled to be sequentially dequeued based on the dequeuing speed of the brush objects. That is, the user may determine the automatic rendering speed of the image based on requirements, which facilitates the user's learning of image rendering and improves the user experience.

In addition, in the second image rendering mode, in response to a reception of a triggering operation on a re-rendering control, the canvas may be cleared to meet the user's requirement for re-rendering the image.

At least two image rendering modes are provided in the method for rendering an image according to the embodiment of the present disclosure. On the basis of the image rendering mode according to the above embodiment, the current mode may be switched to the second image rendering mode, so as to control the automatic rendering of the brushes and provide a teaching video of image rendering for the user. In this way, the requirements of the user for learning of image rendering are further satisfied, thereby improving the use experience of the user.

Figure 6:
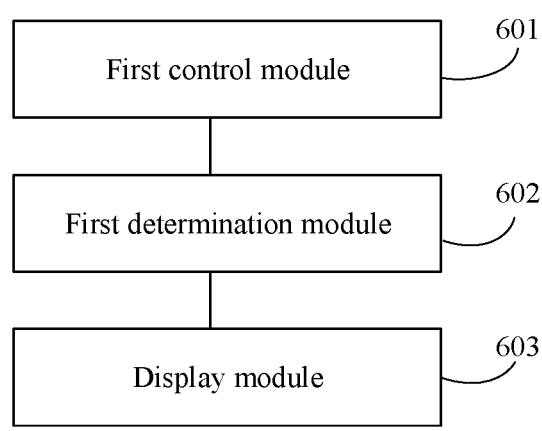
FIG. 6 is a structural block diagram of an apparatus for rendering an image according to an embodiment of the present disclosure.

Corresponding to the foregoing method embodiments, an apparatus for rendering an image is further provided according to the present disclosure. FIG. 6 is a schematic structural diagram of an apparatus for rendering an image according to an embodiment of the present disclosure. Referring to FIG. 6, the apparatus includes a first control module 601, a first determination module 602 and a display module 603.

The first control module 601 is configured to control a brush object at a head of a brush queue to be dequeued, in response to an operation for releasing dragging on a canvas; where attributes of the brush object in the brush queue includes a brush size, a brush direction and brush position information.

The first determination module 602 is configured to determine a display position of a brush rendering guide box based on the brush position information of the currently dequeued brush object, and determine a display range of the brush rendering guide box based on the brush size and the brush direction of the currently dequeued brush object.

The display module 603 is configured to display the brush rendering guide box on the canvas based on the display position and the display range of the brush rendering guide box, where the brush rendering guide box is used to guide a user to render brushes corresponding to an image in a target style.

In an optional embodiment, the apparatus further includes a second control module and a first rendering module.

The second control module is configured to control the brush objects in the brush queue to be sequentially dequeued, in response to a triggering operation for switching a current mode to a target rendering mode.

The first rendering module is configured to render, on the canvas, brushes corresponding to the brush objects sequentially based on the attributes of the brush objects that are sequentially dequeued.

In an optional embodiment, the apparatus further includes a second rendering module.

The second rendering module is configured to rendering, in response to detecting a dragging operation on the canvas, brushes corresponding to the dragging operation on the canvas, where the brush sizes and the colors of the brushes change in real time with the dragging operation.

In an optional embodiment, the apparatus further includes a second determination module.

The second determination module is configured to determine a dequeuing speed of the brush objects in the target rendering mode, in response to an adjusting operation on an image rendering speed.

Correspondingly, the second control module is further configured to control the brush objects in the brush queue to be sequentially dequeued based on the dequeuing speed of the brush objects.

In an optional embodiment, the apparatus further includes: a clear module configured to clear the canvas in response to a triggering operation on a re-rendering control.

In an optional embodiment, the apparatus further includes a third determination module and a fourth determination module.

The third determination module is configured to determine a target image effect picture in response to an adjusting operation on an image color.

The fourth determination module is configured to determine, based on the target image effect picture, colors of brushes rendered on the canvas after the adjusting operation on the image color.

With the apparatus for rendering an image according to the embodiments of the present disclosure, the brush rendering guide box is displayed for a user on the canvas based on the attributes of the brush objects in the brush queue, so that the user can render the brushes based on the brush rendering guide box, in order to satisfy the requirements of the user for learning and entertainment of image rendering and improve the user experience.

In addition, with the apparatus for rendering an image according to the embodiments of the present disclosure, the rendering of the brush may be automatically controlled, to provide a teaching video of image rendering for the user, which further satisfies the requirements of the user for learning of image rendering, thereby further improving the use experience of the user.

Figure 7:
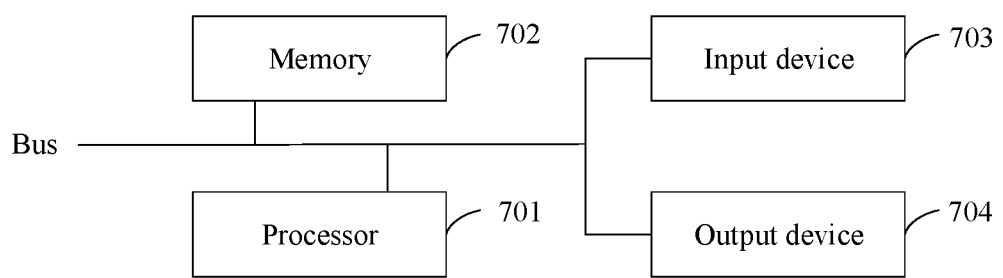
FIG. 7 is a structural block diagram of a device for rendering an image according to an embodiment of the present disclosure.

In addition, a device for rendering an image is further provided according to an embodiment of the present disclosure. As shown in FIG. 7, the device may include: a processor 701, a memory 702, an input apparatus 703 and an output apparatus 704.

The number of the processors 701 in the device for rendering the image may be set in a number of one or more, and one processor is taken as an example in FIG. 7. In some embodiments of the present disclosure, the processor 701, the memory 702, the input apparatus 703 and the output apparatus 704 may be connected via a bus or in other ways, where the connection via a bus is taken as an example in FIG. 7.

The memory 702 can be used to store software programs and modules, and the processor 701 executes various functional applications and data processing of the device for rendering the image by running the software programs and modules stored in the memory 702. The memory 702 may mainly include a program memory area and a data memory area. An operating system, an application required by at least one function and the like may be stored in the program memory area. In addition, the memory 702 may include high-speed random access memory, and may also include non-volatile memory, such as at least one magnetic disk storage device, flash memory device, or other volatile solid state storage device. The input apparatus 703 may be used to receive input numerical or character information, and input a signal related to user settings and function control of the apparatus for rendering the image.

In the embodiment, the processor 701 may load an executable file corresponding to the processes of one or more application programs into the memory 702 in response to an instruction, and the processor 701 runs the application program stored in the memory 702, thereby realizing various functions in the foregoing apparatus for rendering the image.

It should be noted that the relational terms "first", "second" and the like in the description are used for distinguishing an entity or operation from another entity or operation, but not intended to require or imply an actual relationship or order between these entities or operations. In addition, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, a process, method, article or device limited by "comprising/including a(n) . . . " does not exclude existence of another identical element in such process, method, article or device.

The above are only specific implementations of the present disclosure, so that those skilled in the art can understand or implement the present disclosure. It is obvious for those skilled in the art to make many modifications to these embodiments. The general principle defined herein may be applied to other embodiments without departing from the sprit or scope of the present disclosure. Therefore, the present disclosure is not limited to the embodiments illustrated herein, but should be defined by the broadest scope consistent with the principle and novel features disclosed herein.

The invention claimed is:

1. A method for rendering an image, comprising:
controlling a brush object at a head of a brush queue to be dequeued, in response to an operation for releasing dragging on a canvas; wherein attributes of the brush object in the brush queue comprise a brush size, a brush direction and brush position information;
determining a display position of a brush rendering guide box based on the brush position information of the currently dequeued brush object, and determining a display range of the brush rendering guide box based on the brush size and the brush direction of the currently dequeued brush object; and
displaying the brush rendering guide box on the canvas based on the display position and the display range of the brush rendering guide box, wherein the brush rendering guide box is used to guide a user to render brushes corresponding to an image in a target style.

2. The method according to claim 1, further comprising:
controlling brush objects in the brush queue to be sequentially dequeued, in response to a triggering operation for switching a current mode to a target rendering mode; and
rendering, on the canvas, brushes corresponding to the brush objects sequentially based on the attributes of the brush objects that are sequentially dequeued.

3. The method according to claim 2, further comprising:
determining a dequeuing speed of the brush objects in the target rendering mode, in response to an adjusting operation on an image rendering speed; and
the controlling the brush objects in the brush queue to be sequentially dequeued comprises:
controlling the brush objects in the brush queue to be sequentially dequeued based on the dequeuing speed of the brush objects.

4. The method according to claim 1, further comprising:
rendering, in response to detecting a dragging operation on the canvas, brushes corresponding to the dragging operation on the canvas; wherein the brush sizes and the colors of the brushes change in real time with the dragging operation.

5. The method according to claim 4, further comprising:
clearing the canvas, in response to a triggering operation on a re-rendering control.

6. The method according to claim 1, further comprising:
determining a target image effect picture in response to an adjusting operation on an image color; and
determining, based on the target image effect picture, colors of brushes rendered on the canvas after the adjusting operation on the image color.

7. The method according to claim 1, further comprising:
obtaining a brush queue corresponding to a target rendering difficulty, in response to a selection operation of the target rendering difficulty; wherein brush queues corresponding to different rendering difficulties have different numbers of brush objects.

8. A non-transitory computer-readable storage medium, wherein instructions are stored in the non-transitory computer-readable storage medium; and the instructions, when executed by a terminal device, cause the terminal device to:
control a brush object at a head of a brush queue to be dequeued, in response to an operation for releasing dragging on a canvas; wherein attributes of the brush object in the brush queue comprise a brush size, a brush direction and brush position information;
determine a display position of a brush rendering guide box based on the brush position information of the currently dequeued brush object, and determine a display range of the brush rendering guide box based on the brush size and the brush direction of the currently dequeued brush object; and
display the brush rendering guide box on the canvas based on the display position and the display range of the brush rendering guide box, wherein the brush rendering guide box is used to guide a user to render brushes corresponding to an image in a target style.

9. The non-transitory computer-readable storage medium according to claim 8, wherein the instructions, when executed by a terminal device, cause the terminal device to
control brush objects in the brush queue to be sequentially dequeued, in response to a triggering operation for switching a current mode to a target rendering mode; and render, on the canvas, brushes corresponding to the brush objects sequentially based on the attributes of the brush objects that are sequentially dequeued.

10. The non-transitory computer-readable storage medium according to claim 8, wherein the instructions, when executed by a terminal device, cause the terminal device to render, in response to detecting a dragging operation on the canvas, brushes corresponding to the dragging operation on the canvas; wherein the brush sizes and the colors of the brushes change in real time with the dragging operation.

11. The non-transitory computer-readable storage medium according to claim 10, wherein the instructions, when executed by a terminal device, cause the terminal device to
 determine a dequeuing speed of the brush objects in the target rendering mode, in response to an adjusting operation on an image rendering speed; and
 control the brush objects in the brush queue to be sequentially dequeued based on the dequeuing speed of the brush objects.

12. The non-transitory computer-readable storage medium according to claim 11, wherein the instructions, when executed by a terminal device, cause the terminal device to clear the canvas, in response to a triggering operation on a re-rendering control.

13. The non-transitory computer-readable storage medium according to claim 8, wherein the instructions, when executed by a terminal device, cause the terminal device to
 determine a target image effect picture in response to an adjusting operation on an image color; and
 determine, based on the target image effect picture, colors of brushes rendered on the canvas after the adjusting operation on the image color.

14. A device, comprising: a memory, a processor, and computer programs stored in the memory and executable on the processor, wherein the processor, when executing the computer programs, implements a method for rendering an image, and where the method comprises:
 controlling a brush object at a head of a brush queue to be dequeued, in response to an operation for releasing dragging on a canvas: wherein attributes of the brush object in the brush queue comprise a brush size, a brush direction and brush position information;
 determining a display position of a brush rendering guide box based on the brush position information of the currently dequeued brush object, and determining a display range of the brush rendering guide box based on the brush size and the brush direction of the currently dequeued brush object; and
 displaying the brush rendering guide box on the canvas based on the display position and the display range of the brush rendering guide box, wherein the brush rendering guide box is used to guide a user to render brushes corresponding to an image in a target style.

15. The device according to claim 14, wherein the method further comprises:
 controlling brush objects in the brush queue to be sequentially dequeued, in response to a triggering operation for switching a current mode to a target rendering mode; and
 rendering, on the canvas, brushes corresponding to the brush objects sequentially based on the attributes of the brush objects that are sequentially dequeued.

16. The device according to claim 14, wherein the method further comprises:
 rendering, in response to detecting a dragging operation on the canvas, brushes corresponding to the dragging operation on the canvas; wherein the brush sizes and the colors of the brushes change in real time with the dragging operation.

17. The device according to claim 15, wherein the method further comprises:
 determining a dequeuing speed of the brush objects in the target rendering mode, in response to an adjusting operation on an image rendering speed; and
 the controlling the brush objects in the brush queue to be sequentially dequeued comprises:
  controlling the brush objects in the brush queue to be sequentially dequeued based on the dequeuing speed of the brush objects.

18. The device according to claim 17, wherein the method further comprises:
 clearing the canvas, in response to a triggering operation on a re-rendering control.

19. The device according to claim 14, wherein the method further comprises:
 determining a target image effect picture in response to an adjusting operation on an image color; and
 determining, based on the target image effect picture, colors of brushes rendered on the canvas after the adjusting operation on the image color.

20. The device according to claim 14, wherein the method further comprises:
 obtaining a brush queue corresponding to a target rendering difficulty, in response to a selection operation of the target rendering difficulty; wherein brush queues corresponding to different rendering difficulties have different numbers of brush objects.

* * * * *